(12) United States Patent
Peterson et al.

(10) Patent No.: US 8,351,595 B2
(45) Date of Patent: Jan. 8, 2013

(54) RESTORATION OF A CALLER TO A PREVIOUS PLACE IN AN ON-HOLD QUEUE

(75) Inventors: David Owen Peterson, Lehi, UT (US); Tim Harris, Lehi, UT (US); Brian Douglas Minert, Orem, UT (US); Bryan Craig Pino, Riverton, UT (US); Nicholas Bauer Ramond, Draper, UT (US); Mark Erik Rasi-Koskinen, Riverton, UT (US)

(73) Assignee: Incontact, Inc., Midvale, UT (US)

( * ) Notice: Subject to any disclaimer, the term of this patent is extended or adjusted under 35 U.S.C. 154(b) by 190 days.

(21) Appl. No.: 12/908,716

(22) Filed: Oct. 20, 2010

(65) Prior Publication Data

US 2012/0099721 A1 Apr. 26, 2012

(51) Int. Cl.
  *H04M 1/64* (2006.01)
(52) U.S. Cl. ............................... 379/265.02; 379/266.01
(58) Field of Classification Search .............. 379/266.01
  See application file for complete search history.

(56) References Cited

U.S. PATENT DOCUMENTS

| | | | | |
|---|---|---|---|---|
| 6,724,885 | B1 * | 4/2004 | Deutsch et al. | 379/265.02 |
| 2010/0266113 | A1 * | 10/2010 | Hartley | 379/207.04 |
| 2011/0235798 | A1 * | 9/2011 | Ibrahim et al. | 379/265.14 |

* cited by examiner

*Primary Examiner* — Creighton Smith
(74) *Attorney, Agent, or Firm* — Maschoff Gilmore & Israelsen

(57) ABSTRACT

A method for an automated call distribution system to re-associate a caller with a queue position previously established in an on-hold queue. The method includes receiving a first incoming call from a caller and assigning the caller to a position in an on-hold queue when the caller is placed on-hold by the automated call distribution system. A placeholder for the caller may then be assigned in the on-hold queue when the caller disconnects with the automated call distribution system. The placeholder corresponds to the position of the caller in the on-hold queue and is associated with a caller identifier. The method further includes receiving a second incoming call from the caller and associating the second incoming call with the caller identifier. It is then determined that the caller is associated with the placeholder. The caller is placed back into the on-hold queue at the position of the placeholder.

17 Claims, 8 Drawing Sheets

100

RESTORATION OF A CALLER TO A PREVIOUS PLACE IN AN ON-HOLD QUEUE

BACKGROUND

Callers to businesses are often greeted by automated contact-handling systems such as Automated Call Distribution Systems (ACD) with their associated Interactive Voice Response (IVR) units. Such systems serve the purpose of providing the caller with automated information, connection to a particular department/function such as Sales, Service, etc. Many such systems support call queuing, where the caller waits on hold in a queue to be connected to an agent of the called business, often while hearing "music on hold" or other pre-recorded audio meant to entertain the customer or present to him/her informational, advertising, marketing, or sales messages.

When the on-hold experience has exceed the caller's patience threshold, it is not unusual for the caller to disconnect, at which time the caller often experiences negative attitudes towards the called business due to unmet expectations and wasted time.

BRIEF SUMMARY

One embodiment disclosed herein relates to a method for an automated call distribution system to re-associate a caller with a queue position previously established in an on-hold queue. The method includes receiving a first incoming call from a caller and assigning the caller to a position in an on-hold queue when the caller is placed on-hold by the automated call distribution system. A placeholder for the caller may then be assigned in the on-hold queue if the caller disconnects with the automated call distribution system while on-hold. The placeholder corresponds to the position of the caller in the on-hold queue and is associated with a caller identifier.

The method further includes receiving a second incoming call from the caller and associating the second incoming call with the caller identifier. It is then determined that the caller is associated with the placeholder. The caller is placed back into the on-hold queue at the position of the placeholder.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION

Reference will now be made to the figures wherein like structures will be provided with like reference designations. It is understood that the figures are diagrammatic and schematic representations of some embodiments of the invention, and are not limiting of the present invention, nor are they necessarily drawn to scale.

Figure 1:
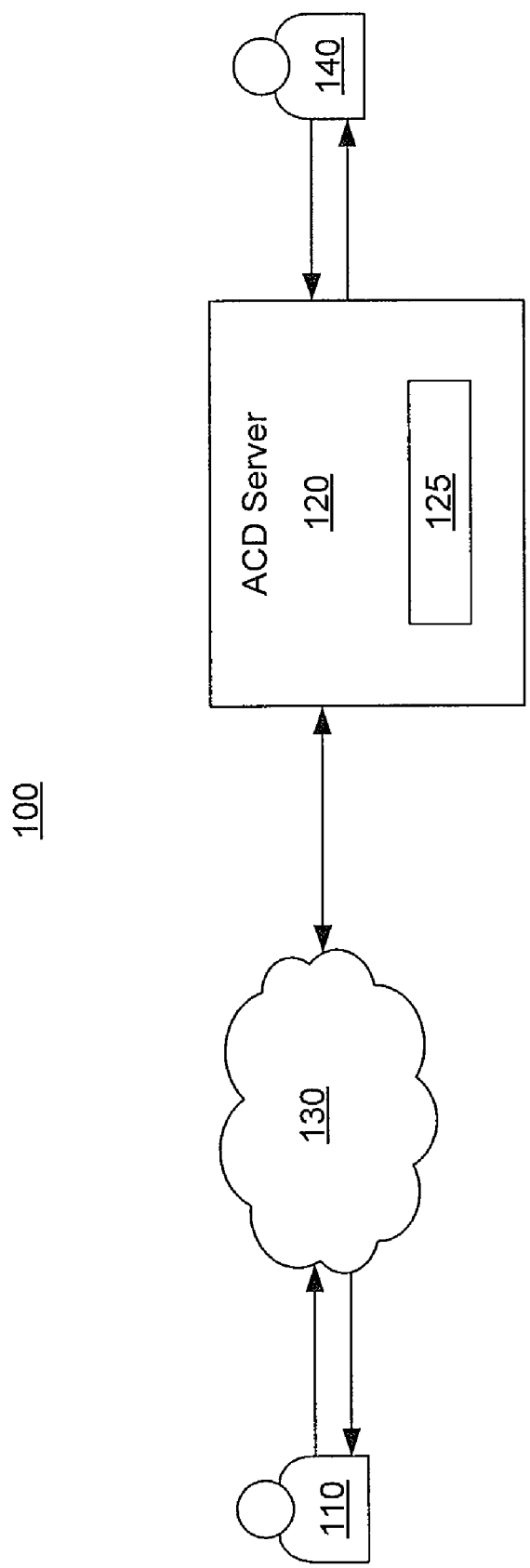
FIG. 1 illustrates an automated call distribution system capable of performing the embodiments disclosed herein.

FIG. 1 illustrates a block diagram of an automated call distribution system 100 which allows for the re-association of a caller with a position that has been previously established in an on-line queue. The automated call distribution system 100 includes a caller 110 and an Automatic Call Distribution (ACD) server 120.

The caller 110 may place a call to the ACD server 120. Accordingly, the caller 110 and the ACD server 120 may be connected by a network 130. As shown in FIG. 1, the caller 110 and the ACD server 120 may communicate with each other bi-directionally over the network 130. The network 130 may be any network that is compatible with the caller 110 and the ACD server 120. For example, the network 130 can include a telephone network. A telephone network can allow a customer to place a telephone call to, or receive a telephone call from, the automated call distribution system 100. For example, the network 130 can include the public switched telephone network (PSTN). The PSTN is the network of the world's public circuit-switched telephone networks, or the networks set-up by telephone companies and governments to provide telephone access to homes and businesses. The PSTN can include analog or digital systems and can include fixed or mobile telephones.

Additionally or alternatively, the network 130 can include a computer network that allows email, chat, or voice over internet protocol (VOIP). VOIP can include a family of transmission technologies for delivery of voice communications over IP networks such as the Internet or other packet-switched networks. The Internet includes a global internetwork formed by logical and physical connections between multiple wide area networks and/or local area networks. Alternately or additionally, the network 130 can include one or more cellular RF networks and/or one or more wired and/or wireless networks such as, but not limited to, 802.xx networks, Bluetooth access points, wireless access points, IP-based networks, satellite networks, or the like. The network 130 may also include servers or other switches that enable one type of network to interface with another type of network. In some embodiments, network 130 may be a private network or virtual private network.

The ACD server 120 may receive the call from the caller 110 and may provide Interactive Voice Response (IVR) services to the caller 110 and may also connect the caller 110 with an agent or other live support personal 140 of a business the caller desires to speak with. However, it is often the case that that the agent 140 will not be available for connection to the caller 110 at the time the call is received by the ACD server 120. In such circumstances, the ACD server 120 may place the call from the caller 110 into an on-hold queue 125. The caller 110 then remains in the on-hold queue 125 until his or her call reaches the front of the on-hold queue, at which time the ACD server 120 may connect the caller 110 with the agent 140.

When the on-hold experience exceeds the patience of caller 110, it is not unusual for the caller 110 to disconnect with ACD server 120. Accordingly, in some embodiments, the ACD 120 supports a customer good-will feature known as a callback option that offers an option to call the caller 110 back when his or her wait time would have ended, rather than risking caller 110 dissatisfaction. During the callback option, the ACD server 120 will typically ask the caller 110 to enter a phone number of a phone that he or she would like to receive a return call at. The caller 110 may then end the connection with the ACD server 120 while still retaining his or her place in the on-hold queue 125, even though he or she is no longer connected to the ACD server 120. When his or her position in the on-hold queue progresses to the point of agent connection, which is typically the front of the on-hold queue 125, the ACD server 120 places the return call, and if answered by caller 110, connects the caller to the agent 140. In some embodiments, the ACD server 120 may automatically call back the caller 110 if the caller 110 is disconnected with the ACD server 120.

Sometimes, however, if the caller 110 has opted for a callback but gets impatient and calls again, he or she is put at the back of the on-hold queue 125 like any other new caller. Consequently, the caller 110 may occupy two separate on-hold queue 125 positions: the original call-back queue position and the new end-of-the-on-hold queue "live" position. If the caller 110's original queue position becomes eligible for agent connection while the caller 110 is still connected in the second ("live") queue position, the ACD server 120 attempting to fulfill the callback may find that the caller's phone line is busy, resulting in the discarding of the original queue position. The caller 110 then must suffer the full length of wait time for the agent 140 or again opt out and wait for the callback. Accordingly, in some embodiments disclosed herein the ACD server 120 is able to re-associate the caller 110 with the original on-hold queue position so that the caller need not have two on-hold queue positions, but rather be reassociated with the original queue position.

Figure 2:
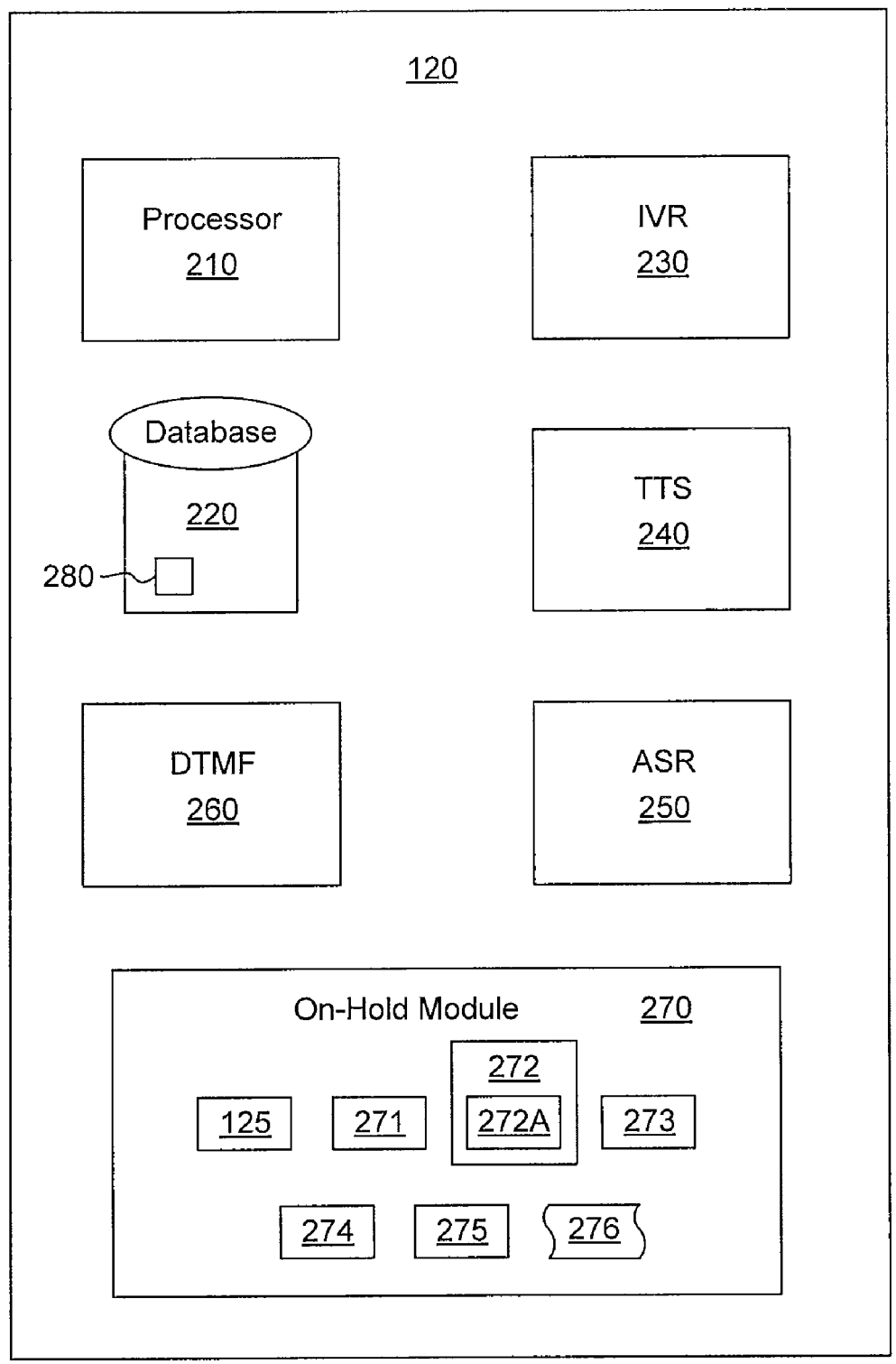
FIG. 2 illustrates an automatic call distribution server in accordance with the embodiments disclosed herein.

Attention is now given to FIG. 2, which illustrates an example embodiment of the ACD server 120. As illustrated, the ACD server 120 includes various operational modules and components that allow the ACD server 120 to manage the re-association of a caller with a position in the on-hold queue. Although not necessarily shown as being coupled, so as to not distract from the embodiments disclosed herein, it will be understood that the various operational modules, components, and databases of the ACD server 120 may be coupled to each other by any reasonable means such as a computer bus, other wiring, or wireless connection as circumstances warrant. In addition, it will be understood that although the various operational modules, components, and databases of the ACD server 120 are shown as being separate, this need not be the case. In some illustrative embodiments, the one or more modules or databases may be included within another module or database.

The ACD server 120 includes a processor 210. The processor 210 may be any reasonable processor and in operation allows the ACD server 120 to perform various operations. In some embodiments, the processor 210 may be accessed by the various operational modules of the ACD server 120 to provide the modules processing resources.

The ACD server 120 also includes a database or memory 220. The database 220 may be any type of reasonable non-volatile or volatile memory. The database 220 is able to provide data storage for the other modules and components of ACD server 120. In one embodiment, the database 220 includes a library of caller identifiers as will be explained in more detail to follow.

The ACD server 120 further includes an Interactive Voice Recognition (IVR) module or component 230. The IVR module 230 provides IVR functionality to incoming calls from the caller 110. For example, an incoming call will cause the IVR module 230 to activate. The IVR module 230 may then provide an IVR message to the caller that will direct them to make a selection. For instance, an IVR message may specify "Please press 1 for Sales, 2 for Customer Service". Depending on which selection the caller makes, the IVR module 230 will then direct the caller to the next message or to an on-hold module as will be explained.

The IVR module 230 may work in conjunction with a Text to Speech (TTS) module 240. The TTS module 240 is configured to generate a voice representation of text. For example, the TTS module 240 allows a text message to become vocalized and then played to a caller as part of the IVR functionality.

The ACD server 120 also includes an Automatic Speech Recognition (ASR) module 250, which may work in conjunction with the IVR module 230. The ASR module 250 is configured to recognize a response that is spoken. For example, a caller may be prompted by an IVR message to make a selection. The caller may then respond with a spoken selection. The ASR module will interpret the spoken selection and provide the response to the IVR module 230 so that the caller may be directed to the next message or the on-hold module.

The IVR 230 module may also work in conjunction with a Dual Tone Multi-Frequency (DTMF) module 260. The DTMF module 260 is configured to recognize the various dial tones of each button on a standard telephone. In this way, when a caller presses the 1 button on the phone in response to the IVR message, the DTMF module 260 is able to recognize that the 1 button has been selected. The response may then be provided to the IVR module 230 so that the caller may be directed to the next message or to the on-hold module.

As mentioned, the ACD server 120 also includes an on-hold module 270. The on-hold module 270 includes the on-hold queue 125. In operation, the on-hold module 270 may determine that the agent who the caller 110 desires to speak with is not currently available. In response, the on-hold module 270 places the caller in the on-hold queue 125. When the caller has moved to the front of the queue, which is typically the point in time where the caller 110 is to be connected with the agent 140, the on-hold module 270 then connects the caller 110 to the agent 140.

In some embodiments, the on-hold module 270 may include an on-hold audio module 273. The on-hold audio module 273 is configured to include music, recorded instructions, advertising, or other content that may be played to the caller 110 while the caller is on hold. In some embodiments, the on-hold audio module 273 may utilize the IVR module 230 or some other module to inform the caller 110 of the anticipated on-hold time. In addition, the on-hold module 273 may utilize the IVR module 230 or some other module to prompt the caller 110 to initiate a callback option or to enter identifying information as will be explained in more detail to follow.

The on-hold module 270 also includes a placeholder generator 275. As mentioned previously, the caller 110 may become tired of waiting on hold and may desire to end the connection with the ACD server 120. In such embodiments, the placeholder generator 275 may generate and then associate a placeholder 276 with the caller 110 upon receiving input from the caller that the connection is to end. The placeholder 276 will correspond to and be placed at the position in the on-line queue 125 that the caller was in prior to the placeholder being generated.

In one embodiment, the placeholder 276 may be a callback option. As previously mentioned, a callback option will typically cause the ACD server 120 to initiate an outgoing call to the caller 110 when the placeholder 276, in this case is the callback option, reaches the front of the on-hold queue 125. When the caller 110 answers the outgoing call from the ACD server 120, he or she is typically connected with the agent 140.

In one embodiment, the on-hold audio module 273, typically by utilizing the IVR module 230 although other modules may also be used, notifies the caller 110 that the callback option is available and informs the caller 110 of what actions are required to initiate the callback back option. In such embodiments, if the caller 110 desires the callback option, he or she will provide input to the ACD server 120 that indicates the desire for the callback option such as pressing a phone key or entering a phone number to initiate the process. The placeholder 276 will then be generated and the caller 110 will receive the callback when the placeholder 276 reaches the front of the on-hold queue 125.

Many callers, however, can only be on the phone at self-scheduled or random intervals due to appointments or chaotic social or business environments and cannot rely on or tolerate a callback at a random time when the placeholder 276 reaches the front of on-hold queue 125. Accordingly, in some embodiments the on hold module 270 includes a scheduler 271 that allows the caller 110 to schedule a time that he or she would like to receive the callback. Utilizing the IVR module 230 or other module, the scheduler 271 may allow the caller 110 to schedule a time that is later than the time when the placeholder 276 reaches the front of on-hold queue 125 that he or she would desire to receive the callback. The scheduler 271 may then tag the placeholder 276 with the scheduled time so that a callback does not automatically occur when the placeholder 276 reaches the front of the on-hold queue 125. Rather, when the scheduled time arrives, the ACD server 120 will initiate the outgoing callback to the caller 110. In this way, the caller 110 will receive the callback at a time that is more convenient for him or her to answer the call back and to talk with the agent 140.

In some embodiments, it may be necessary to associate the placeholder 276 with the caller 110 by use of a caller identifier as will be explained in more detail to follow. In such embodiments, the on-hold module 270 may also include an identifier module 272. In operation, the identifier module 272 is able to determine a specific identifier 272A that is related to the caller and/or the telephone being used by the caller.

For example, in one embodiment, the identifier module 272 may identify an incoming call of the caller 110 by use of the Automatic Number Identifier (ANI) or a Caller Line Identifier (CLI). As will be appreciated, the ANI or the CLI identify the phone number of the incoming call. It will be noted that the term "phone" is used herein to mean any type of device that allows a caller to communicate with the ACD server 120. Thus, the ANI or the CLI may identify the location or the phone that is used to make the incoming call. The identifier module 272 may then associate the placeholder 276 with an identifier 272A based on the ANI or the CLI. This allows the ACD server 120 to keep track of callers who have been assigned a placeholder 276. The ACD server 120 may use the identifier 272A based on the ANI or the CLI to determine the phone number to place the call back to when the callback option is initiated. In addition, the identifier 272A based on the ANI or the CLI may allow the ACD server 120 to associate the placeholder 276 with a second incoming call from the caller 110 so that the caller 110 may be placed back into position in the on-hold queue 125 as will be described in more detail to follow.

In some situations the caller 110 may place a first incoming call on a first phone, for example his or her home phone, to ACD server 120 for connection to the agent 140. This call may then be placed in the on-hold queue 125 as previously discussed. The caller 110 may then desire to end connection with the ACD server 120, upon which a placeholder 276 may be generated as also previously described. However, the caller 110 may desire to initiate the callback option to receive a callback on a different phone or phone line or may desire to reconnect with the ACD server 120 using a different phone line or phone. In such cases, it may be advantageous to tie the identifier 272A to other caller identification information such as an account number in addition to the ANI or the CLI.

Accordingly, the identification module 272 may generate an identifier 272A that is based on other caller identifying information. For example, in one embodiment, the database 220 may include information 280 about the caller 110. The information 280 may include, for example, a phone number for each of the phones or phone lines that the caller 110 regularly uses or a subset thereof. In this way, the caller 110 may provide a phone number for his or her home phone, work phone, cell phone, spouse's cell phone, and any number of additional phones as circumstances warrant. The information 280 may be tagged with the caller 110's Social Security Number, a customer ID, an account number, or any other number or the like that may easily associate the information 280 with the caller 110. It will be appreciated that the database 220 may include other information similar to that of information 280 for callers other than caller 110.

In operation, the identification module 272 may use IVR module 230 or some other module to ask the caller 110 to input his or her Social Security Number, customer ID, account number, or other linking information for information 280. The identification module 272 may then determine that information 280 exists in the database 220 and associate the identifier 272A with the information 280 as well as the placeholder 276. Alternatively, the caller 110 may manually enter the information 280 or similar information when prompted by the IVR module 230.

Accordingly, when the caller 110 initiates a callback option, the ACD server 120 may call back the various phones and/or phone numbers associated with the information 280. Likewise, if the caller 110 reconnects to the ACD server 120 by a second incoming call from a phone or phone number other than the phone or phone number used in the first incoming call, the information 280 may be used to help the identification module 272 associate the new phone or phone number with the previously established placeholder 276.

In some instances, a caller 110 may not answer an outgoing callback, whether the call is made when the placeholder 276 reaches the front of the on-hold queue 125 or when a scheduled callback time is reached. This may occur because the caller 110 is away from his or her phone(s) or is otherwise unable to answer the phone. In some embodiments, when such as circumstance occurs, the scheduler 271 may be configured to determine that the callback was not answered and to allocate a specified amount of time for the caller 110 to call back ACD server 120. If the caller 110 initiates a second incoming call with the ACD server 120 within the specified amount of time, the caller 110 may be re-associated with the placeholder 276 in the on-hold queue 125 as will be explained in more detail to follow. However, if the second incoming call is not received by the ACD server 120 within the specified time, then the placeholder 276 is removed from the on-hold queue 125.

In other instances, when an outgoing callback is made, an answering machine, voice mail, or other messaging service of the caller 110 answers the outgoing call. In such circumstances, the ACD server 120 may utilize the IVR module 230 to leave a message on the answering machine, voice mail, or other messaging service that specifies an amount of time for the caller 110 to initiate a second incoming call with the ACD server 120. If the caller 110 initiates a second incoming call with the ACD server 120 within the specified amount of time, the caller 110 may be re-associated with the placeholder 276 in the on-hold queue 125 as will be explained in more detail to follow. However, if the second incoming call is not received by the ACD server 120 within the specified time, then the placeholder 276 is removed from the on-hold queue 125.

Sometimes, after the caller 110 has disconnected from the ACD server 120 and a placeholder 276 has been generated, the caller 110 may grow inpatient waiting for a callback. The caller 110 thus may reconnect with the ACD server 120 by providing a second incoming call to the ACD server. In such circumstances, the IVR module 230 or some other module may answer the second incoming phone call as normally done. However, in one embodiment the on-hold module 270 may determine, based on the second incoming call's ANI or CLI, that the second incoming call should be associated with the identifier 272A of a previously generated placeholder 276. Based on this, the on-hold module 270 may then be able to re-associate the caller 110 with the placeholder 276. In other words, the on-hold module 270 is able to use the identifier 272A to determine that the caller 110 who placed the first incoming call that led to the generation of the placeholder 276 is the same as the caller 110 who is placing the second incoming call.

The on-hold module 270 may then place the caller 110 back into the on-hold queue 125 at the position of the placeholder 276. That is, the caller 110 is re-associated with the placeholder 276. Accordingly, the caller 110 is not given a new on-hold queue 125 position, but is placed back into the on-hold queue where he or she would have originally been. When the caller 110 reaches the front of the on-hold queue 125, he or she may then be connected by the ACD server 120 with the agent 140.

In other embodiments, the IVR module 230 or other module may prompt the caller 110 to input a Social Security Number, account number, customer ID, or similar identifying information upon receiving the second incoming call. As mentioned previously, this information may then be used by the on-hold module 270 to associate the second incoming call with the identifier 272A and the previously generated placeholder 276. Because the Social Security Number, account number, customer ID, or similar identifying information is tied to information 280, which specifies the various phone and/or phone line or numbers used by the caller 110, the second incoming call may be associated with the identifier 272A and the previously generated placeholder 276 even if the second incoming call is made using a different phone or phone number. The on-hold module 270 may then place the caller 110 back into the on-hold queue 125 at the position of the placeholder 276 without giving the caller 110 a new on-hold queue 125 position.

In one embodiment, the on-hold module 270 attempts to determine if the second incoming call is associated with any placeholders 276 in the on-hold queue 125 by first determining the second incoming call's ANI or CLI. If a placeholder 276 is associated with the second incoming call's ANI or CLI, then the on-hold module 270 places the caller back into the on-hold queue 125 as described. However, if the second incoming call's ANI or CLI is not associated with a placeholder 276, the on-hold module 270 may then utilize the IVR module 230 or some other module to prompt the caller 110 to enter his or her Social Security Number, account number, customer ID, or similar identifying information. This information may then be used to determine if a placeholder 276 is associated with the second incoming call in the manner previously described. If the placeholder 276 is associated with the second incoming call, then the caller 110 may be placed back into the on-hold queue 125 as described.

In some embodiments, the on-hold module 270 may include a time allocation module 274. In operation, the time allocation module 274 may, in response to receiving input that indicates that the caller 110 no longer desires to remain connected with the ACD server 120, utilize the IVR module 230 or some other module to inform the caller 110 that he or she needs to call the ACD server 120 back within a specified amount of time to retain his or her place in the on-hold queue 125. The specified amount of time may typically correspond to the estimated amount of time for the caller 110 to reach the front of the on-line queue 125, although any specified amount of time may be used.

The placeholder 276 is then generated and associated with the identifier 272A as previously described. When the caller 110 calls back the ACD server 120 within the specified time, the incoming second call may be associated with the placeholder 276 in the manner previously described and the caller 110 may be placed back into the on-hold queue 125 at the position he or she would have originally been.

In those embodiments where the caller 110 has been informed he or she has the specified amount of time to call back the ACD server 120, the placeholder 276 does not expire automatically when the placeholder reaches the front of the on-hold queue 125. Rather, placeholder 276 stays at or near the front of the on-hold queue 125 until the second incoming call is received or the specified time expires. In this way, the caller 110 is given the full time that he or she is expecting to have to place the second incoming call before losing his or her place in the on-hold queue 125.

In other embodiments, the time allocation module 274 may add a predetermined grace period to the specified amount of time if the caller 110 does not call back the ACD server 120 during the specified time. The predetermined grace period may further reduce caller frustration as it provides the caller 110 with additional time to retain his or her place in the on-hold queue 125.

As previously discussed, a placeholder 276 may be generated in the on-hold queue 125 when the caller provides input that he or she no longer desires to wait on hold. The placeholder 276 may be a callback option that will cause the ACD server 120 to place an outgoing call to the caller 110 when the placeholder 276 reaches the front of the on-hold queue 125. The caller 110, however, may become inpatient and may place a second incoming call to the ACD server 120 prior to the placeholder 276 reaching the front of the on-hold queue 125. The second incoming call may then be associated with the placeholder 276 as also previously described.

In one embodiment, the caller 110 is not automatically placed back into the on-hold queue 125 at the position of the placeholder 276. Rather, the on-hold module 270 utilizes the IVR module 230 or some other module to inform the caller 110 that the current placeholder 276 will initiate a callback in a given amount of time. The on-hold module 270 may then hang up or otherwise allow the caller 110 to take no action. The result will be that the callback will occur in the given amount of time.

Alternatively, the on-hold module 270 may allow the caller 110 to be placed into the on-hold queue 125 in the position of the placeholder 276. The caller 110 will be connected to the agent 140 when the caller 110 reaches the front of the on-hold queue 125 as previously described.

As an additional option, the on-hold module 270 may further allow the caller 110 to specify an additional amount of time for the caller to call back the ACD server 120 without losing his or her place in the on-hold queue 125. The time allocation module 274 will track the additional time and may add a grace period. If the caller 110 calls back the ACD server 120 within the additional amount of time (or during the grace period) the place in the on-hold queue 125 will be retained.

In some circumstances, the caller 110 may simply hang up after being placed in the on-hold queue 125 without providing any other input to the ACD server 120 that would indicate a desire to receive a callback. In one embodiment, the on-hold module 270 treats the hang up as input that specifies that the user no longer desires to remain connected to the ACD server 120. In response, the on-hold module 270 generates a placeholder 276 for the caller 110. If the caller 110 calls back before the placeholder 276 has reached the front of the on-hold queue 125, he or she may be re-associated with the placeholder 276 in the manner previously described. Advantageously, this embodiment provides an additional way to prevent caller frustration as the caller is automatically given a placeholder 276 and the opportunity to keep his or her place in the on-hold queue 125.

Figure 3:
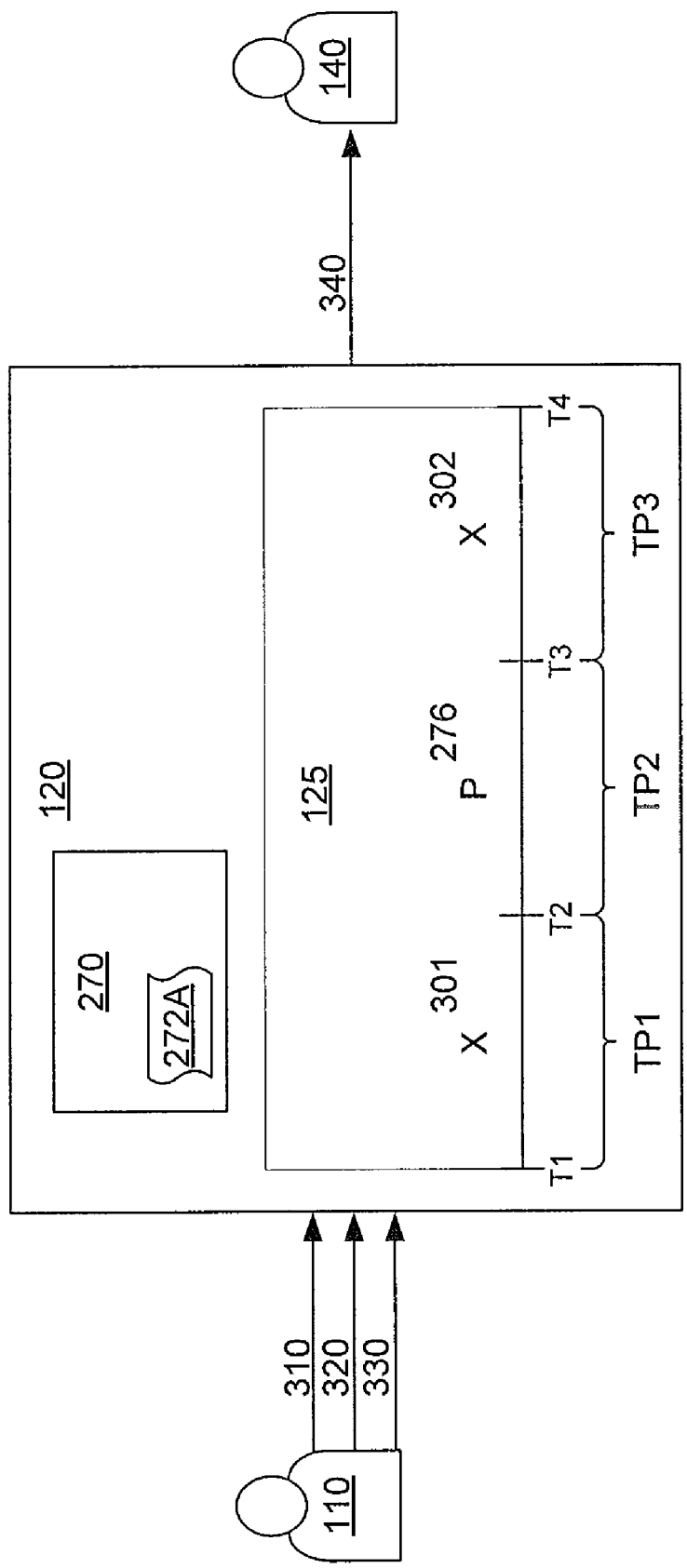
FIG. 3 illustrates the flow of re-associating a caller with a previously established position in an on-hold queue in accordance with the embodiments disclosed herein.
Figure 4:
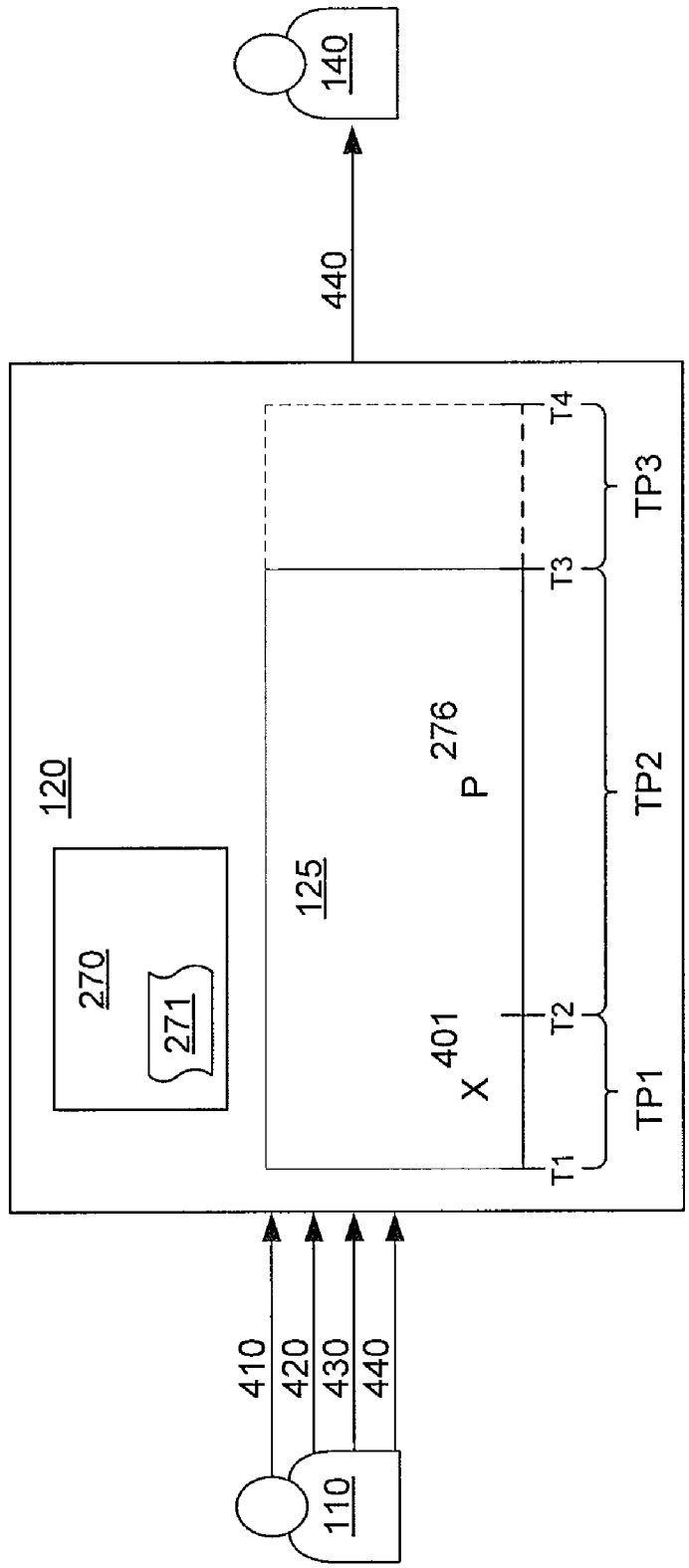
FIG. 4 illustrates the flow of scheduling a callback option in an on-hold queue in accordance with the embodiments disclosed herein.
Figure 5:
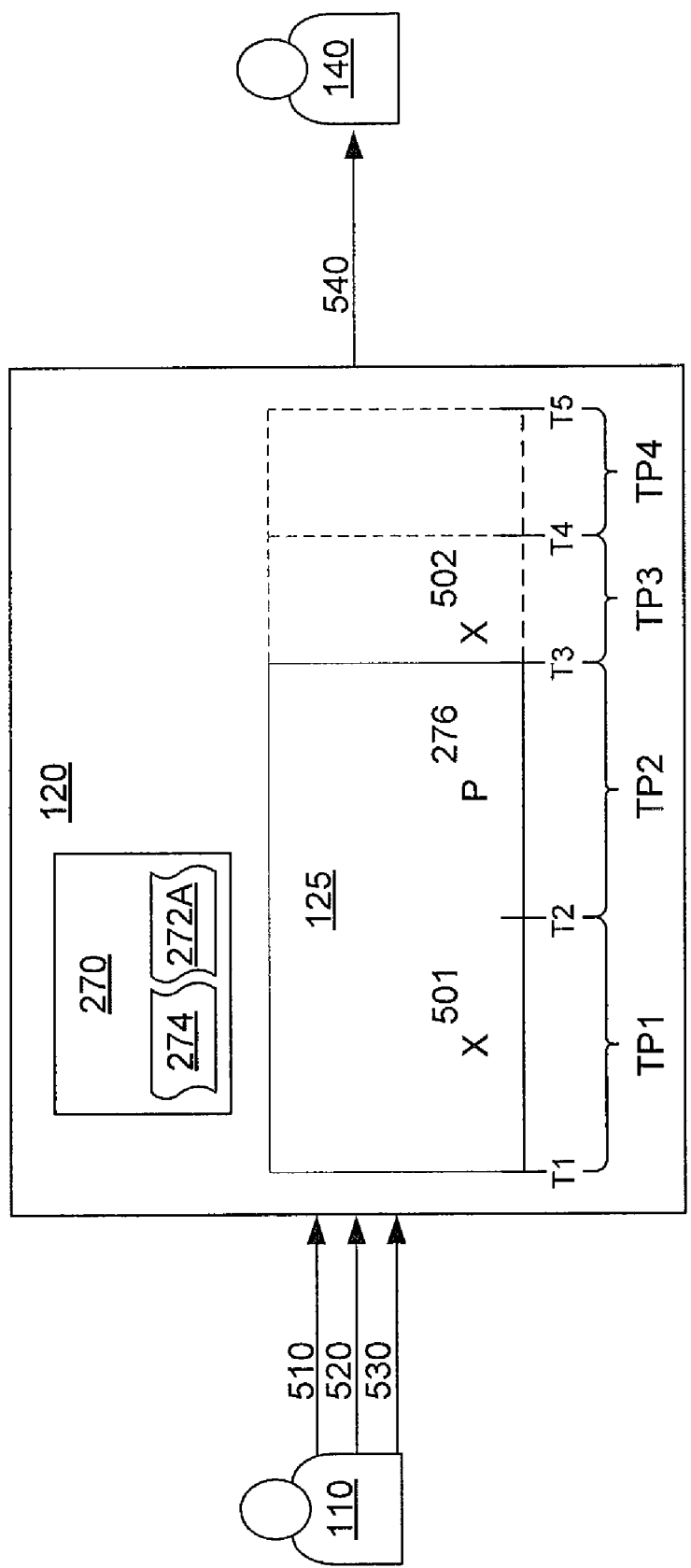
FIG. 5 illustrates the flow of allocating time for a callback that re-associates a caller with a previously-established position in an on-hold queue in accordance with the embodiments disclosed herein.

Having described embodiments of an ACD server 120, attention is now given to describing various aspects of the automated call distribution system 100. Attention is first given to FIG. 3, which illustrates the flow of re-associating a caller with a previously established placeholder in the on-hold queue 125 of the ACD server 120. In FIGS. 3, 4, and 5, the network 120 has been omitted so that the additional features of these figures may be seen more clearly. In addition, although not illustrated, it will be appreciated that the on-hold queue 125 may include additional calls besides those from the caller 110.

As illustrated, the ACD server 120 receives a first incoming call 310 from the caller 110 for connection to the agent 140. The ACD server 120 then determines that agent 140 is not currently available and at time T1 places the caller 110 into a position in the on-hold queue 125. This is illustrated in FIG. 3 by position X 301. The position X 301 then progresses in the on-hold queue 125 during a time period Tp1.

At a time T2, the ACD server 120 receives input 320 from the caller 110 indicating that the caller 110 no longer desires to be connected to the ACD server 120. In response, the ACD server 120 generates a placeholder P 276 and places P 276 into the position in the on-hold queue 125 of position X 301 at time T2. As previously discussed, placeholder P 276 is also associated with an identifier 272A that identifies the caller 110 and/or the phone or phone number used to make the first incoming call 310. The placeholder P 276 progresses in the on-hold queue 125 during a time period Tp2.

At a time T3, the ACD server 120 receives a second incoming call 330 from the caller 110. The ACD server 120 associates the second incoming call 330 with the identifier 272A and with the placeholder P 276 as previously described. Based on this, the ACD server 120 re-associates the caller 110 with his or previous position in the on-hold queue 125 by placing the caller back into the on-hold queue 125 at the position of the placeholder P 276. This is illustrated in FIG. 3 by position X 302.

The position X 302 then progresses in the on-hold queue 125 during a time period Tp3 to a time T4, which is when the caller 110 has reached the front of the on-hold queue 125. At the time T4, the ACD server 120 connects the caller 110 with the agent 140 as illustrated by 340.

Attention is now given to FIG. 4, which shows a callback aspect of the embodiments disclosed herein. As illustrated, the ACD server 120 receives a first incoming call 410 from the caller 110 for connection to the agent 140. The ACD server 120 then determines that agent 140 is not currently available and at time T1 places the caller into a position in the on-hold queue 125. This is illustrated in FIG. 4 by position X 401. The position X 401 then progresses in the on-hold queue 125 during a time period Tp1.

At a time T2, the ACD server 120 receives input 420 from the caller 110 indicating that the caller 110 no longer desires to be connected to the ACD server 120. In response, the ACD server 120 generates a placeholder P 276 and places P 276 into the position in the on-hold queue 125 of the position X 401 at time T2. As previously mentioned, the placeholder P 276 in this embodiment may be a callback option that causes ACD server 120 to callback the caller 110. In addition, the scheduler 271 may allow the caller 110 to specify a specific time that he or she would like to receive the callback from the ACD server 120.

The placeholder P 276 progresses in the on-hold queue 125 during a time period Tp2. At a time T3, placeholder P 276 reaches the front of the on-hold queue 125. In some embodiments, this may trigger the callback to caller 110. However, in the illustrated embodiment the amount of time specified by the caller 110 to receive the callback has not yet been reached. Accordingly, the placeholder P 276 is kept at or near the front of the on-hold queue 125 as illustrated by the dashed lines in FIG. 4 for a time period Tp3.

At a time T4, the specified amount of time has been reached and the placeholder P 276 causes the ACD server 120 to place the callback phone call 430 to the caller 110. When the caller 110 answers the phone call 430, he or she is connected to the agent 140 as illustrated by 440.

Attention is now given to FIG. 5, which shows additional aspects of the embodiments disclosed herein. As illustrated, the ACD server 120 receives a first incoming call 510 from the caller 110 for connection to the agent 140. The ACD server 120 then determines that agent 140 is not currently available and at time T1 places the caller into a position in the on-hold queue 125. This is illustrated in FIG. 5 by position X 501. The position X 501 then progresses in the on-hold queue 125 during a time period Tp1.

At a time T2, the ACD server 120 receives input 520 from the caller 110 indicating that the caller 110 no longer desires to be connected to the ACD server 120. In response, the ACD server 120 generates a placeholder P 276 and places P 276 into the position in the on-hold queue 125 of the position X 501 at time T2. As previously discussed, placeholder P 276 is also associated with an identifier 272A that identifies the caller 110 and/or the phone or phone number used to make first incoming call 510. In addition, the time allocation module 274 may specify or may allow the caller 110 to specify an amount of time for the caller 110 to call back the ACD server 120 to keep his or her position in the on-hold queue 125.

The placeholder P 276 progresses in the on-hold queue 125 during a time period Tp2. At a time T3, placeholder P 276 reaches the front of the on-hold queue 125. In the illustrated embodiment the amount of time specified for the caller 110 to call back ACD server 120 has not yet been reached. Accordingly, the placeholder P 276 does not expire, but is kept at or near the front of the on-hold queue 125 as illustrated by the first dashed lines in FIG. 5 for a time period Tp3.

At a time T4, the specified amount of time has been reached. If ACD server 120 receives a second incoming call 530 from the caller 110 by time T4, the ACD server 120 connects him or her with the agent 140 as illustrated by 540.

In some embodiments, if the second incoming call 530 is not reached by time T4, the placeholder P 276 expires. However, in other embodiments the time allocation module 274 may allocate a grace period of time for the ACD server 120 to receive the second incoming call 530 to give the caller 110 more time. This is illustrated in FIG. 5 by time period Tp4. At a time T5 the grace period has expired and the placeholder P 276 will expire if the ACD server 120 has not received the second incoming call 530 from the caller 110.

Figure 6:
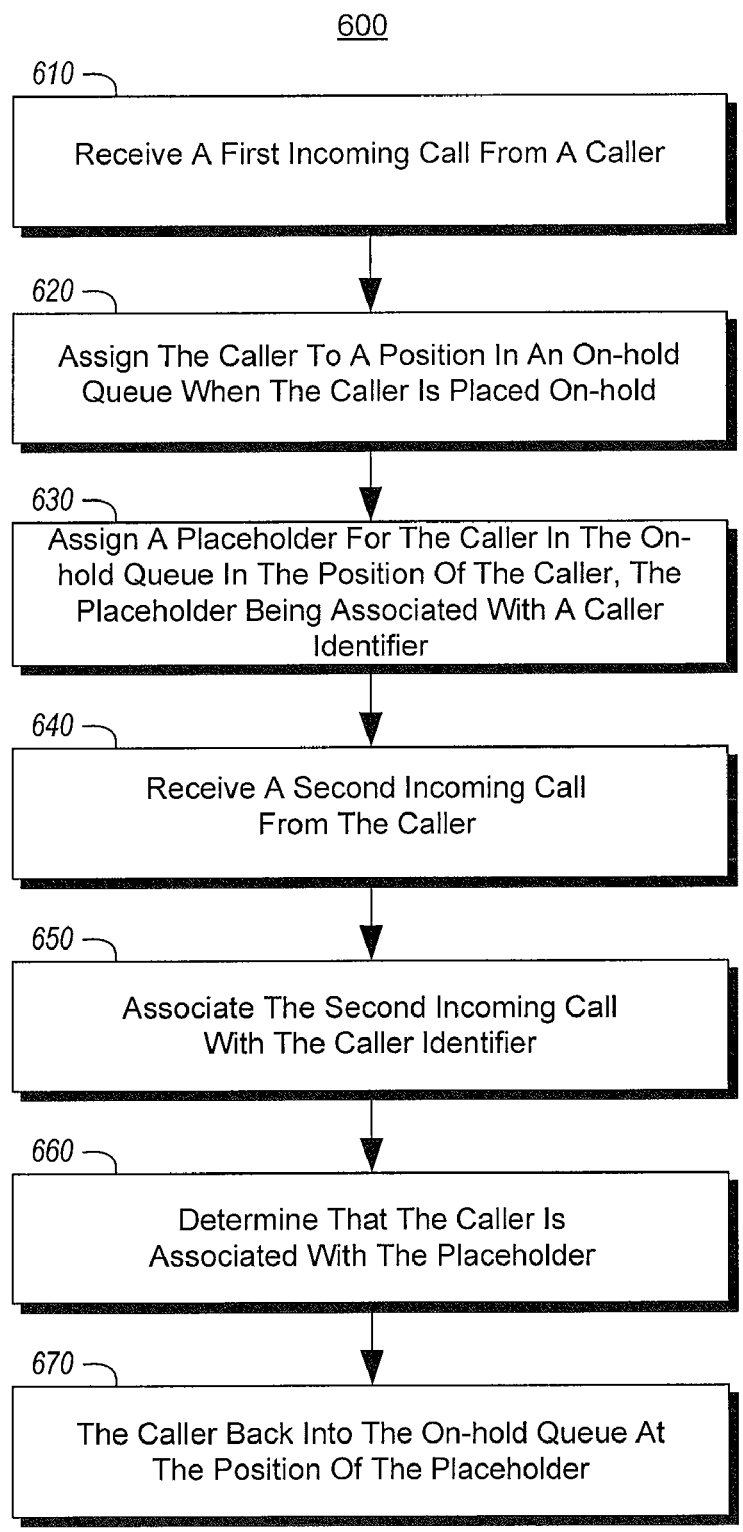
FIG. 6 illustrates a flow diagram of a method for re-associating a caller with a previously-established position in an on-hold queue in accordance with the embodiments disclosed herein.

Attention is now made to FIG. 6, which illustrates a flow diagram of a method 600 for re-associating a caller with a queue position previously established in an on-hold queue. The method 600 may be performed in the automated call distribution system previously described in relation to FIGS. 1-5.

The method 600 includes receiving 610 a first incoming call from a caller. For example, the ACD server 120 may receive a first incoming call 310 from the caller 110.

The method 600 also includes assigning 620 the caller to a position in an on-hold queue when the caller is placed on-hold. For example, the on-hold module 270 may assign the caller 110 a position in the on-hold queue 125.

The method 600 further includes assigning 630 a placeholder for the caller in the on-hold queue in response to receiving input specifying that the caller no longer desires to remain connected to the automated call distribution system. The placeholder may correspond to the position of the caller in the on-hold queue and may be associated with a caller identifier that identifies the phone number and/or the telephone being used by the caller. For example, the placeholder generator 275 may generate a placeholder 276 when the ACD server 120 receives input 320 from the caller 110 that the caller no longer desires to be connected to the ACD server 120. The input 320 may be simply hanging up or it may be input such as entering a phone number or pressing a given phone key in response to being informed of the estimated on-hold wait time. Other types of user input 320 may also be received. The placeholder 276 may be placed in the on-hold queue 125 at the position of the caller 110 and may be associated with a caller identifier 272A by the identification module 272 as previously described.

The method 600 also includes receiving 640 a second incoming call from the caller and associating 650 the second incoming call with the caller identifier. For example, the ACD server 120 may receive the second incoming call 330. The on-hold module 270 may then associate the second incoming call 330 with the caller identifier 272A as previously discussed.

The method 600 further includes determining 660, in response to the second incoming call, that the caller is associated with the placeholder and placing 670 the caller back into the on-hold queue at the position of the placeholder. For example, the on-hold module 270 may determine that caller 110 is associated with the placeholder 276 in the manner previously described. The on-hold module 270 may then place the caller back into the on-hold queue 125 in the position of the placeholder 276.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 7:
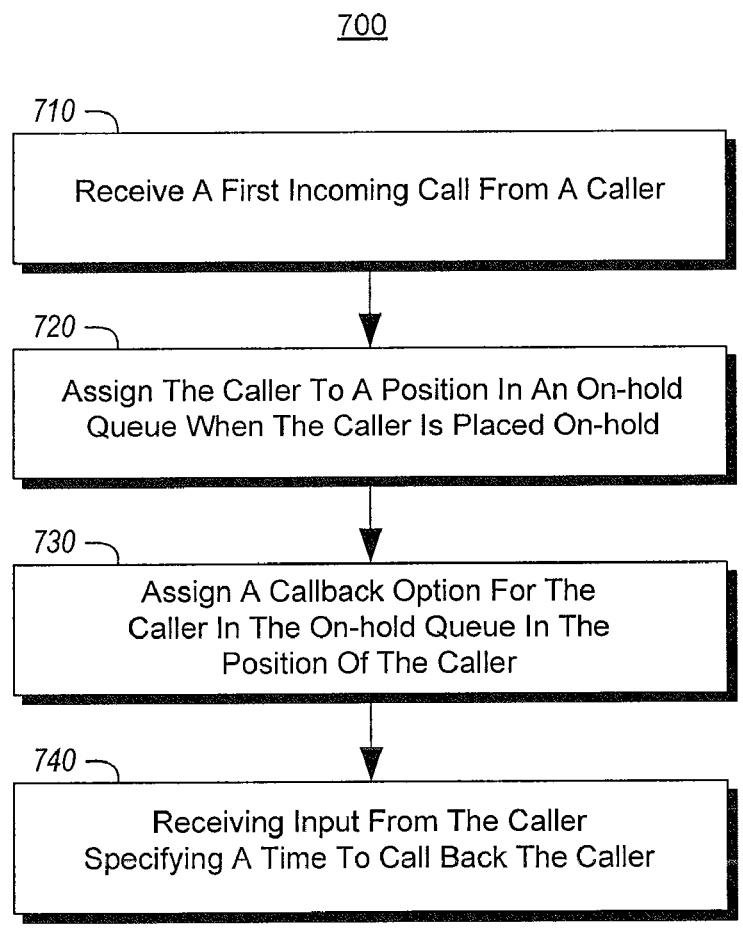
FIG. 7 illustrates a flow diagram of a method for scheduling a callback option in an on-hold queue in accordance with the embodiments disclosed herein.

Attention is now made to FIG. 7, which illustrates a flow diagram of a method 700 for an automated call distribution system to allow a caller to schedule a callback in an on hold queue. The method 700 may be performed in the automated call distribution system previously described in relation to FIGS. 1-5.

The method 700 includes receiving 710 a first incoming call from a caller. For example, ACD server 120 may receive an incoming call 410 from the caller 110.

The method 700 also includes assigning 720 the caller to a position in an on-hold queue when the caller is placed on-hold. For example, the on-hold module 270 may assign the caller 110 a position in the on-hold queue 125.

The method 700 further includes assigning a callback option for the caller in the on-hold queue in response to receiving input specifying that the caller no longer desires to remain connected to the automated call distribution system. The callback option may correspond to the position of the caller in the on-hold queue and may cause the automated call distribution system to call back the caller. For example, the placeholder generator 275 may generate a placeholder 276, which may be the callback option, when the ACD server 120 receives input 420 from the caller 110 that the caller no longer desires to be connected to the ACD server 120. The input 420 may be simply hanging up or it may be input such as entering a phone number or pressing a given phone key in response to being informed of the estimated on-hold wait time. Other types of user input 420 may also be received. The placeholder 276 may be placed in the on-hold queue 125 at the position of the caller 110.

The method 700 further includes receiving input from the caller specifying a time that is different than a time the callback option progresses in the on-hold queue to the point of agent connection to call back the caller. For example, the input 420 may cause the scheduler 271 to tag a specified time to the placeholder 276 for the caller to receive the callback.

Figure 8:
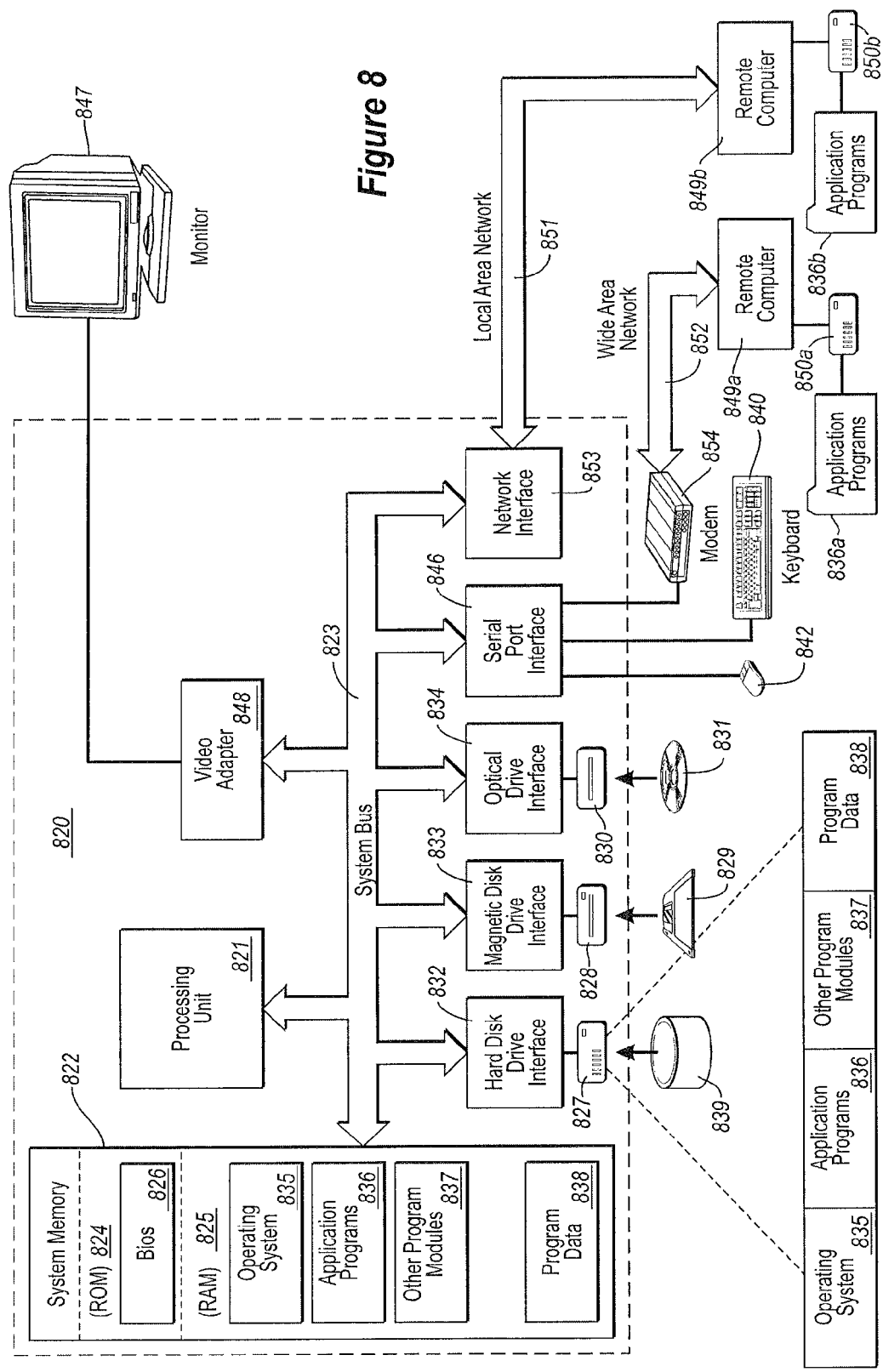
FIG. 8 illustrates a suitable computing environment in which the embodiments disclosed herein may be implemented.

FIG. 8 and the following discussion are intended to provide a brief, general description of a suitable computing environment in which the invention may be implemented. Although not required, the invention will be described in the general context of computer executable instructions, such as program modules, being executed by computers in network environments. Generally, program modules include routines, programs, objects, components, data structures, etc. that perform particular actions or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, mobile phones, multi-processor systems, microprocessor-based or programmable consumer electronics, network PCs, minicomputers, mainframe computers, and the like. The invention may also be practiced in distributed computing environments where actions are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 8, an example system for implementing the invention includes a general purpose computing device in the form of a conventional computer 820, including a processing unit 821, a system memory 822, and a system bus 823 that couples various system components including the system memory 822 to the processing unit 821. It should be noted however, that as mobile phones become more sophisticated, mobile phones are beginning to incorporate many of the components illustrated for conventional computer 820. Accordingly, with relatively minor adjustments, mostly with respect to input/output devices, the description of conventional computer 820 applies equally to mobile phones. The system bus 823 may be any of several types of bus structures including a memory bus or memory controller, a peripheral bus, and a local bus using any of a variety of bus architectures. The system memory includes read only memory (ROM) 824 and random access memory (RAM) 825. A basic input/output system (BIOS) 826, containing the basic routines that help transfer information between elements within the computer 820, such as during start-up, may be stored in ROM 824.

The computer 820 may also include a magnetic hard disk drive 827 for reading from, and writing to, a magnetic hard disk 839, a magnetic disk drive 828 for reading from or writing to a removable magnetic disk 829, and an optical disc drive 830 for reading from, or writing to, removable optical disc 831 such as a CD-ROM or other optical media. The magnetic hard disk drive 827, magnetic disk drive 828, and optical disc drive 830 are connected to the system bus 823 by a hard disk drive interface 832, a magnetic disk drive-interface 833, and an optical drive interface 834, respectively. The drives and their associated computer-readable media provide nonvolatile storage of computer-executable instructions, data structures, program modules and other data for the computer 820. Although the exemplary environment described herein employs a magnetic hard disk 839, a removable magnetic disk 829 and a removable optical disc 831, other types of computer readable media for storing data can be used, including magnetic cassettes, flash memory cards, digital versatile discs, RAMs, ROMs, and the like.

Program code means comprising one or more program modules may be stored on the hard disk 839, magnetic disk 829, optical disc 831, ROM 824 or RAM 825, including an operating system 835, one or more application programs 836, other program modules 837, and program data 838. A user may enter commands and information into the computer 820 through keyboard 840, pointing device 842, or other input devices (not shown), such as a microphone, joy stick, game pad, satellite dish, scanner, or the like. These and other input devices are often connected to the processing unit 821 through a serial port interface 846 coupled to system bus 823. Alternatively, the input devices may be connected by other interfaces, such as a parallel port, a game port or a universal serial bus (USB). A monitor 847 or another display device is also connected to system bus 823 via an interface, such as video adapter 848. In addition to the monitor, personal computers typically include other peripheral output devices (not shown), such as speakers and printers.

The computer 820 may operate in a networked environment using logical connections to one or more remote computers, such as remote computers 849a and 849b. Remote computers 849a and 849b may each be another personal computer, a server, a router, a network PC, a peer device or other common network node, and typically include many or all of the elements described above relative to the computer 820, although only memory storage devices 850a and 850b and their associated application programs 836a and 836b have been illustrated in FIG. 8. The logical connections depicted in FIG. 8 include a local area network (LAN) 851 and a wide area network (WAN) 852 that are presented here by way of example and not limitation. Such networking environments are commonplace in office-wide or enterprise-wide computer networks, intranets and the Internet.

When used in a LAN networking environment, the computer 820 is connected to the local network 851 through a network interface or adapter 853. When used in a WAN networking environment, the computer 820 may include a modem 854, a wireless link, or other means for establishing communications over the wide area network 852, such as the Internet. The modem 854, which may be internal or external, is connected to the system bus 823 via the serial port interface 846. In a networked environment, program modules depicted relative to the computer 820, or portions thereof, may be stored in the remote memory storage device. It will be appreciated that the network connections shown are exemplary and other means of establishing communications over wide area network 852 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for an automated call distribution system to re-associate a caller with a queue position previously established in an on-hold queue, the method comprising:

receiving at the automated call distribution system a first incoming call from a caller;

assigning the caller to a position in an on-hold queue when the caller is placed on-hold by the automated call distribution system;

assigning a placeholder for the caller in the on-hold queue in response to receiving input specifying that the caller no longer desires to remain connected to the automated call distribution system, the placeholder corresponding to the position of the caller in the on-hold queue and being associated with a caller identifier that identifies the phone number and/or the telephone being used by the caller;

receiving a second incoming call from the caller;

associating the second incoming call with the caller identifier;

determining, in response to the second incoming call, that the caller is associated with the placeholder;

placing the caller back into the on-hold queue at the position of the placeholder;
prior to placing the caller back into the on-hold queue at the position of the placeholder, informing the caller that the placeholder in the on-hold queue associated with the caller will initiate an outgoing call in a specified amount of time;
in response to informing the caller, performing at least one of the following:
placing the caller back into the on-hold queue at the position of the placeholder;
allowing the caller to specify an additional amount of time to call back the automated call distribution system without losing the caller's position in the on-hold queue; or
allowing the existing placeholder in the on-hold queue associated with the caller to initiate the outgoing call at the specified amount of time.

2. The method in accordance with claim 1, wherein the caller identifier is one of an Automatic Number Identifier (ANI) or a Caller Line Identifier (CLI).

3. The method in accordance with claim 1, wherein the caller identifier is one of a Social Security Number, a customer ID, or an account number.

4. The method in accordance with claim 1, wherein assigning a placeholder for the caller in the on-hold queue in response to receiving input specifying that the caller no longer desires to remain connected to the automated call distribution system comprises:
assigning a callback option to the caller, wherein the callback option causes the automated call distribution system to call back the caller when the callback option progresses in the on-hold queue to a point of agent connection if the automated call distribution system does not receive the second incoming call.

5. The method in accordance with claim 4, further comprising:
receiving input from the caller specifying a time that is different than the time the callback option progresses in the on-hold queue to the point of agent connection to call back the caller; and
initiating an outgoing call to the caller at the specified time.

6. The method in accordance with claim 4, further comprising:
initiating an outgoing call to caller;
determining that the caller has not answered the outgoing call;
in response, allotting a specified amount of time to receive the second incoming call from the caller; and
removing the placeholder from the on-hold queue if the second incoming call is not received in the specified amount of time.

7. The method in accordance with claim 4, further comprising:
initiating an outgoing call to caller;
connecting with an answering machine, voice mail, or other messaging system;
leaving a message with the answering machine, voice mail, or other messaging system specifying an amount of time to receive the second incoming call from the caller; and
removing the placeholder from the on-hold queue if the second incoming call is not received in the specified amount of time.

8. The method in accordance claim 1, wherein assigning the placeholder for the caller in the on-hold queue in response to receiving input specifying that the caller no longer desires to remain connected to the automated call distribution system comprises:
specifying an amount of time that the second incoming call should be received from the caller if the caller is to maintain the placeholder in the on-hold queue.

9. The method in accordance with claim 8, wherein if the placeholder progresses in the on-hold queue to a point of agent connection prior to expiration of the specified amount of time, the placeholder stays at or near the front of the on-hold queue until the expiration of the on-hold queue or the second incoming call is received.

10. A method for an automated call distribution system to re-associate a caller with a queue position previously established in an on-hold queue, the method comprising:
receiving at the automated call distribution system a first incoming call from a caller;
assigning the caller to a position in an on-hold queue when the caller is placed on-hold by the automated call distribution system;
assigning a placeholder for the caller in the on-hold queue in response to receiving input specifying that the caller no longer desires to remain connected to the automated call distribution system, the placeholder corresponding to the position of the caller in the on-hold queue and being associated with a caller identifier that identifies the phone number and/or the telephone being used by the caller, wherein assigning the placeholder for the caller in the on-hold queue in response to receiving input specifying that the caller no longer desires to remain connected to the automated call distribution system comprises:
specifying an amount of time that the second incoming call should be received from the caller if the caller is to maintain the placeholder in the on-hold queue;
receiving a second incoming call from the caller;
associating the second incoming call with the caller identifier;
determining, in response to the second incoming call, that the caller is associated with the placeholder; and
placing the caller back into the on-hold queue at the position of the placeholder, wherein:
if the placeholder progresses in the on-hold queue to a point of agent connection prior to expiration of the specified amount of time, the placeholder stays at or near the front of the on-hold queue until the expiration of the on-hold queue or the second incoming call is received; and
a predetermined grace period is added to the specified amount of amount of time if the specified amount of time expires prior to receiving the second incoming call.

11. A non-transitory computer readable media having computer readable instructions for performing the method of claim 1.

12. A method for an automated call distribution system to allow a caller to schedule a callback in an on hold queue, the method comprising:
receiving at an automated call distribution system a first incoming call from a caller;
assigning the caller to a position in an on-hold queue when the caller is placed on-hold by the automated call distribution system;
assigning a callback option for the caller in the on-hold queue in response to receiving input specifying that the caller no longer desires to remain connected to the automated call distribution system, wherein the callback option causes the automated call distribution system to call back the caller, the callback option corresponding to the position of the caller in the on-hold queue;

receiving input from the caller specifying a time that is different than a time the callback option progresses in the on-hold queue to the point of agent connection to call back the caller;

initiating an outgoing call to caller at the specified time;

determining that the caller has not answered the outgoing call;

in response, allotting a specified amount of time to receive a second incoming call from the caller; and removing the callback option from the on-hold queue if the second incoming call is not received in the specified amount of time.

13. The method in accordance with claim 12, further comprising:

initiating an outgoing call to the caller at the specified time.

14. A method for an automated call distribution system to allow a caller to schedule a callback in an on hold queue, the method comprising:

receiving at an automated call distribution system a first incoming call from a caller;

assigning the caller to a position in an on-hold queue when the caller is placed on-hold by the automated call distribution system;

assigning a callback option for the caller in the on-hold queue in response to receiving input specifying that the caller no longer desires to remain connected to the automated call distribution system, wherein the callback option causes the automated call distribution system to call back the caller, the callback option corresponding to the position of the caller in the on-hold queue;

receiving input from the caller specifying a time that is different than a time the callback option progresses in the on-hold queue to the point of agent connection to call back the caller;

initiating an outgoing call to caller at the specified time;

connecting with an answering machine, voice mail, or other messaging system;

leaving a message with the answering machine, voice mail, or other messaging system specifying an amount of time to receive a second incoming call from the caller; and removing the callback option from the on-hold queue if the second incoming call is not received in the specified amount of time.

15. A non-transitory computer readable media having computer readable instructions for performing the method of claim 10.

16. A non-transitory computer readable media having computer readable instructions for performing the method of claim 12.

17. A non-transitory computer readable media having computer readable instructions for performing the method of claim 14.

* * * * *